(12) United States Patent
Bondi et al.

(10) Patent No.: US 12,269,691 B2
(45) Date of Patent: Apr. 8, 2025

(54) SYSTEMS AND METHODS FOR HANDLING MULTIPLE CONTAINER TYPES

(71) Applicant: 764944 Alberta Inc., Calgary (CA)

(72) Inventors: Robert Donald Bondi, Calgary (CA); Allan Joseph Merlo, Calgary (CA)

(73) Assignee: 764944 ALBERTA INC., Calgary (CA)

( * ) Notice: Subject to any disclaimer, the term of this patent is extended or adjusted under 35 U.S.C. 154(b) by 109 days.

(21) Appl. No.: 17/772,419

(22) PCT Filed: Oct. 30, 2020

(86) PCT No.: PCT/CA2020/000122
§ 371 (c)(1),
(2) Date: Apr. 27, 2022

(87) PCT Pub. No.: WO2021/081620
PCT Pub. Date: May 6, 2021

(65) Prior Publication Data
US 2022/0380139 A1 Dec. 1, 2022

Related U.S. Application Data

(60) Provisional application No. 62/928,350, filed on Oct. 30, 2019.

(51) Int. Cl.
*B65G 47/28* (2006.01)
*B65B 43/50* (2006.01)
(Continued)

(52) U.S. Cl.
CPC .............. *B65G 47/28* (2013.01); *B65B 43/50* (2013.01); *B65B 43/60* (2013.01); *B65B 59/003* (2019.05);
(Continued)

(58) Field of Classification Search
CPC .... B65G 47/84; B65G 47/847; B65G 47/846; B65G 47/28; B65B 59/003; B65B 43/50;
(Continued)

(56) References Cited

U.S. PATENT DOCUMENTS 2,608,317 A  8/1952  Taylor et al.
3,660,963 A  5/1972  Sullivan
(Continued)

FOREIGN PATENT DOCUMENTS

GB   168817 A   7/1937
GB   1438531 A  6/1976
(Continued)

OTHER PUBLICATIONS

Dandenault, Felix-Antoine, International Search Report and Written Opinion for International application No. PCT/CA2020/000122, Jan. 5, 2021, 11 pages, ISA/CA, Gatineau, Quebec, Canada.
(Continued)

*Primary Examiner* — James R Bidwell
(74) *Attorney, Agent, or Firm* — FIELD LLP

(57) ABSTRACT

A container indexing assembly is provided, including an indexing wheel; a conveyor chain; and a series of container indexing arms arranged having a fixed spatial relationship to one another other at linear and non-linear speeds. A rotary container starwheel is further provided including one or more grabber arms. A rotary multi-feed can lid assembly is also provided including multiple can lid silos supported on an upper rotating indexing plate; one or more spring loaded ball detents affixed to rotate with the upper rotating indexing plate and a fixed lower indexing plate. A universal closing turret is finally provided including multiple, varying closure applicators for different types of containers, removably
(Continued)

connectable to the turret to allow rearrangement of an order of closure applicators based on an order of types of containers to be closed.

8 Claims, 8 Drawing Sheets

(51) Int. Cl.
| | |
|---|---|
| *B65B 43/60* | (2006.01) |
| *B65B 59/00* | (2006.01) |
| *B65B 59/02* | (2006.01) |
| *B65G 47/84* | (2006.01) |
| *B67C 7/00* | (2006.01) |

(52) U.S. Cl.
CPC ............ *B65B 59/005* (2013.01); *B65B 59/02* (2013.01); *B65G 47/846* (2013.01); *B67C 7/0046* (2013.01); *B65G 2201/0244* (2013.01); *B65G 2201/0252* (2013.01); *B65G 2207/08* (2013.01)

(58) Field of Classification Search
CPC ....... B65B 43/60; B65B 59/005; B65B 59/02; B67C 7/0046
USPC ............................................ 198/473.1, 459.2
See application file for complete search history.

(56) References Cited

U.S. PATENT DOCUMENTS

| | | | | |
|---|---|---|---|---|
| 3,771,576 A | * | 11/1973 | Gellatly | B65B 43/60 141/150 |
| 4,075,086 A | * | 2/1978 | Marsh, III | B65G 47/846 198/803.11 |
| 5,056,650 A | * | 10/1991 | Kronseder | B65G 47/846 198/723 |
| 5,082,105 A | * | 1/1992 | Tincati | B65G 47/846 198/473.1 |
| 5,778,633 A | * | 7/1998 | Sweeny | B65B 59/003 53/201 |
| 7,500,338 B2 | * | 3/2009 | Spatafora | B65B 35/44 53/442 |
| 7,967,127 B2 | * | 6/2011 | Spence | B65G 47/847 198/723 |
| 2008/0230348 A1 | * | 9/2008 | Damen | B65G 29/00 198/459.2 |
| 2015/0344236 A1 | * | 12/2015 | Papsdorf | B65G 29/00 198/473.1 |
| 2016/0297619 A1 | | 10/2016 | Hahn | |
| 2017/0001848 A1 | * | 1/2017 | DiCarlo | B67C 3/24 |
| 2017/0158482 A1 | | 6/2017 | Bondi et al. | |

FOREIGN PATENT DOCUMENTS

| | | | | |
|---|---|---|---|---|
| IT | 202100009941 | * | 10/2022 | ........... B65G 47/842 |
| JP | 3905598 B2 | | 4/2007 | |
| JP | 2017001888 A | | 1/2017 | |
| WO | WO-9416976 A1 | * | 8/1994 | ............. B65G 29/00 |
| WO | WO-2015121087 A1 | * | 8/2015 | ............. B65G 29/00 |
| WO | 2018100004 A1 | | 6/2018 | |
| WO | 2019/096527 A1 | | 5/2019 | |

OTHER PUBLICATIONS

Hoffert, Rudi, Supplementary partial European Search Report and European Search Opinion for application No. EP20882319, Feb. 3, 2023, 11 Pages, European Patent Office, Munich, Germany.

Dandenaulty, Felix-Antoine, International Preliminary Report on Patentability for International application No. PCT/CA2020/000122, Feb. 3, 2022, 6 Pages, IPEA/CA, Gatineau, Quebec, Canada.

* cited by examiner

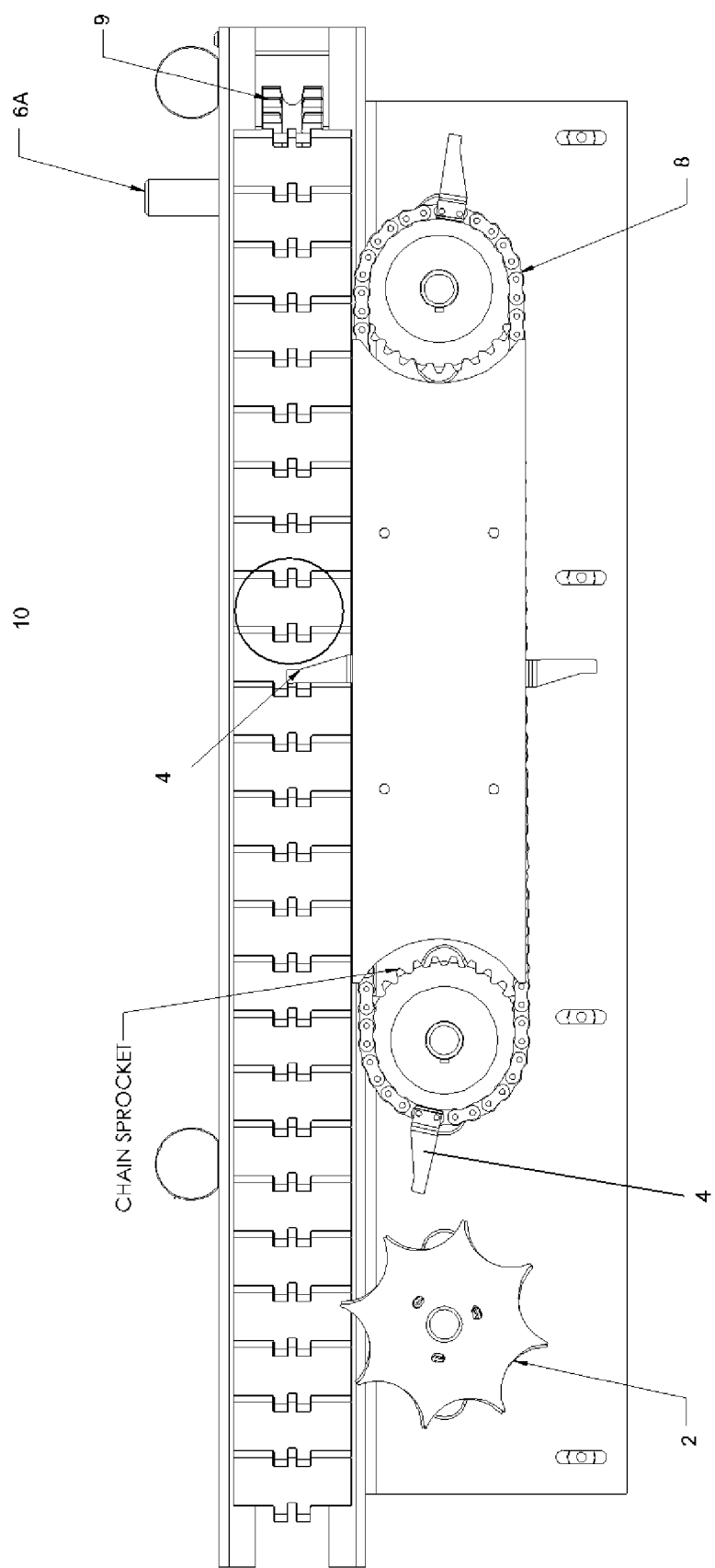

SECTION A-A

SYSTEMS AND METHODS FOR HANDLING MULTIPLE CONTAINER TYPES

FIELD

The present invention relates to machines and systems for handling containers through an indexing, filling, closing and sorting process.

BACKGROUND

Industrial bottling and canning plants that handle non viscous liquids (ex. wine, beer, mineral water, etc.) and/or viscous liquids (ex. oils, condiments etc.) are typically limited to processing only one type of container per system.

The handling equipment and systems often take up a significant footprint, or floor space in a production facility.

In all existing examples of any of the above container handling equipment and systems, the current state of the art is to have a separate set of equipment that has been designed, built and setup specifically to handle only bottles, or cans or other containers. Current day state of the art can, bottle or other container handling equipment is dedicated in nature without the ability to handle multiple container types in one system.

In recent years, there has been exponential growth in micro-manufacturers in the beverage industry. Micro-manufacturing involves small batch brewing and packaging of beverages to smaller, often local but not always, markets. Micro-manufacturers of beverages often change the product that they manufacture from batch to batch and work in small facilities with a goal of versatility.

The present day state of the art dedicated bottle, can and other container handling equipment, be they rotary or inline, do not have the flexibility required in today's micro-manufacturing marketplace. Moreover, should a micro-manufacturer wish to package their beverages in a combination of bottles, cans and other containers, they will be required to house multiple types of handling systems, requiring facilities with much larger footprint than their operations and output justify and going against a goal of minimizing space.

A need therefore exists for container handling devices and systems that can handle multiple container types through various stages of the indexing, filling, closing and transferring process.

SUMMARY

A container indexing assembly is provided, comprising an indexing wheel; a conveyor chain configured for receiving a mixed stream of containers from the indexing wheel; and a series of container indexing arms arranged for movement with the conveyor chain, said container indexing arms each configured for indexing a container by its centerline. Each of said indexing wheel, conveyor chain and series of container indexing arms are arranged having a fixed spatial relationship to one another other at linear and non-linear speeds.

A rotary container starwheel is further provided comprising an upper starwheel; a lower starwheel; and one or more grabber arms. Each of said grabber arms comprises a leading grabber and a trailing grabber having mating spur gears formed there between configured to coordinate movement of the leading grabber with the trailing grabber, a spring configured to actuate the grabber arm to a closed, container grabbing position; and a fixed mechanical cam comprised of a cam wheel having one or more cam lift surfaces configured to contact any one of the leading or trailing grabber arms to actuate opening of the grabber arms.

A rotary multi-feed can lid assembly is also provided comprising a series of vertical can lid silos an upper rotating indexing plate configured to rotatably support each vertical silo in an indexing hole formed on the upper rotating indexing plate; one or more spring loaded ball detents affixed to rotate with the upper rotating indexing plate on a pivot bearing; and a fixed lower indexing plate, positioned between the upper rotating indexing plate and a lid dispenser. The fixed lower indexing plate is formed with a series of indents, aligned radially with the ball detents to allow extension of the spring loaded ball detents as the ball detents rotate with the upper rotating indexing plate. When the ball detent extends into the recesses, then one of the can lid silos are aligned with a single hole machined in the fixed lower indexing plate such that can lids can pass through the lower plate to the lid dispenser.

A universal closing turret is finally provided comprising multiple, varying closure applicators for different types of containers, removably connectable to the turret to allow rearrangement of an order of closure applicators based on an order of types of containers to be closed.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 2 is a top plan view of the container indexing assembly of FIG. 1;

FIG. 4b is a side elevation view of the multi-silo vertical lid feed of FIG. 4a;

FIG. 4c is a cross-sectional rear view of the multi-silo vertical lid feed of FIG. 4a;

FIG. 4d is a top plan view of the multi-silo vertical lid feed of FIG. 4a;

FIG. 4e is a cross sectional of the multi-silo vertical lid feed of FIG. 4a;

FIG. 4f is a front side perspective view of the multi-silo vertical lid feed of FIG. 4a;

FIG. 4g is a cut-away perspective view of the multi-silo vertical lid feed of FIG. 4a;

The drawings are not necessarily to scale and in some instances proportions may have been exaggerated in order to more clearly depict certain features.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly the drawings and detailed description are to be regarded as illustrative in nature and not as restrictive.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

The present invention provides multiple devices and systems for handling a mixed stream of containers, including indexing, sorting and closing the mixed stream of containers such as bottles, cans and other containers.

The devices and systems of the present disclosure can be used in conjunction with a filling machine as described in Applicant's U.S. Pat. No. 10,407,289.

The devices and systems are described in further detail herein, in conjunction with the Figures. The order in which devices are introduced below is not necessarily indicative of their order or arrangement within overall container handling systems taught by the present disclosure.

Figure 1:
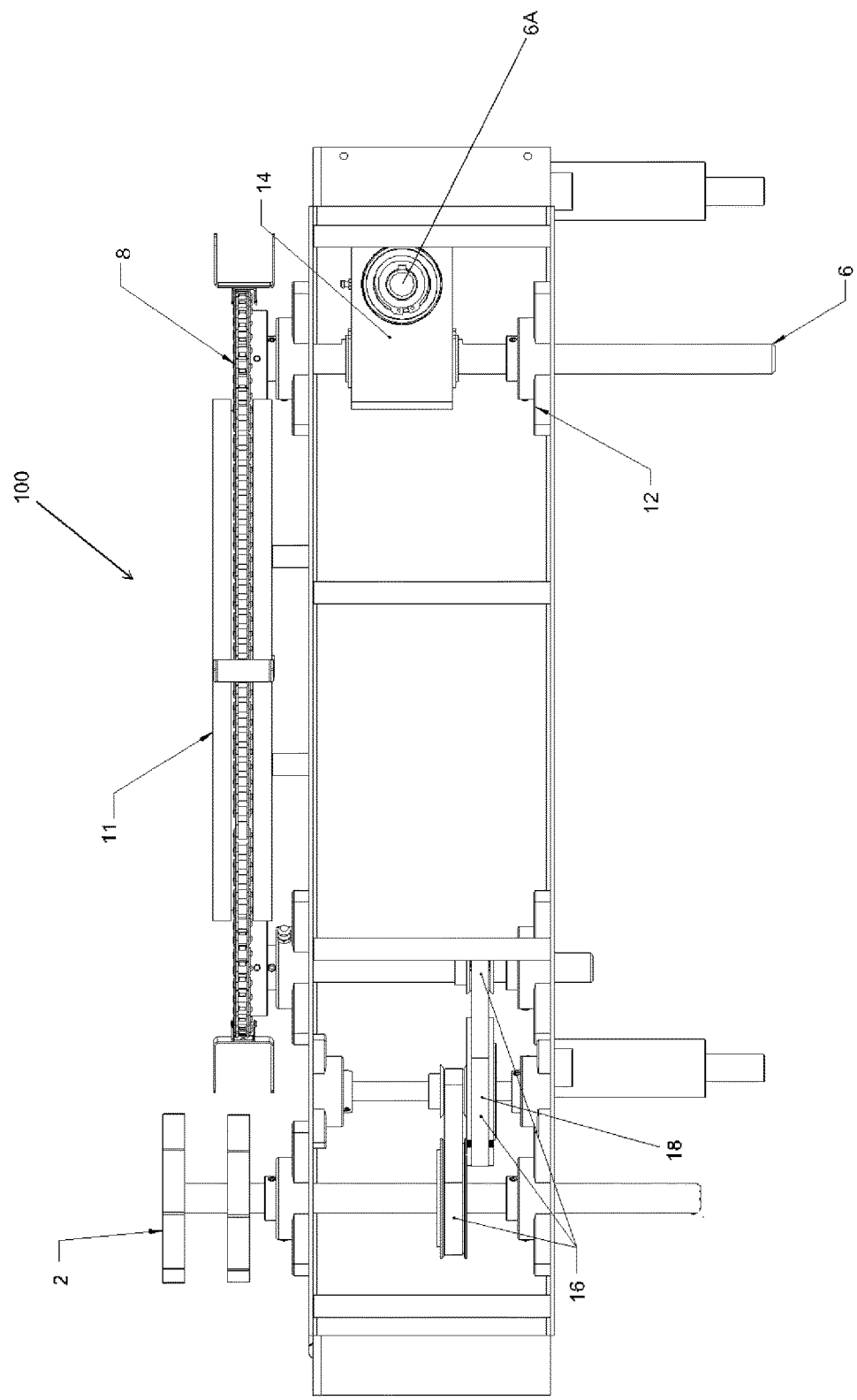
FIG. 1 is side elevation view of a container indexing assembly of the present disclosure.

With reference to FIGS. 1 and 2, a container indexing assembly 100 is shown. The container indexing assembly 100 is non-specific to container type, meaning it can index a mixed stream of containers in any order. The indexing assembly 100 can be mechanically, electrically or pneumatically operated. The container indexing assembly 100 works by indexing containers by their centerline 10, as more clearly shown in FIG. 2, such that the type and shape of container does not factor in the indexing process. The indexing assembly 100 includes an indexing wheel 2, and a series of container indexing arms 4 run along a conveyor chain 8 that is driven by a conveyor drive shaft 6, each having a fixed spatial relationship to one another other at linear and non-linear speeds.

The fixed relationship is mechanical in nature. The conveyor driveshaft 6, supported by bearing blocks 12, drives an angled gear reducer 14 which in turn drives the conveyor chain 8. At the other end, movement of the conveyor chain 8 is transferred via one or more belt drive pulleys 16 through a speed reduction assembly 18 to drive the indexing wheel 2. In this way a fixed, mechanical relationship is set between all moving parts of the indexing assembly 100. A right angle gearbox also drives a conveyor drive sprocket 9 via a set ratio through conveyor output shaft 6A, again providing a fixed relationship between the moving parts. The conveyor chain 8 is preferably housed in a guide block 11. This differs from prior art indexing systems which are timed through a container-specific timing device, typically a feedscrew, and in which the elements of the indexing assembly operate in a non-integrated fashion.

The present indexing assembly 100 can be used at the infeed of a container handling system, where containers are received prior to filling, and could also have applications at other locations and steps in container handling processes.

Figure 3B:
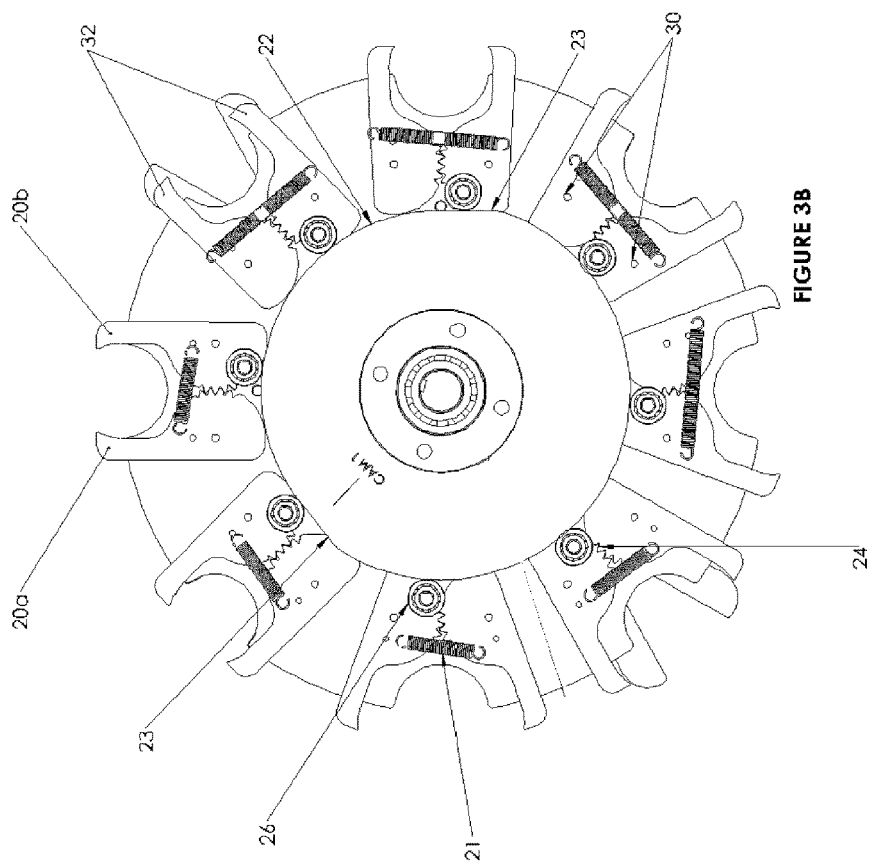
FIG. 3b is a bottom plan view of the guideless starwheel assembly of FIG. 3A.
Figure 3A:
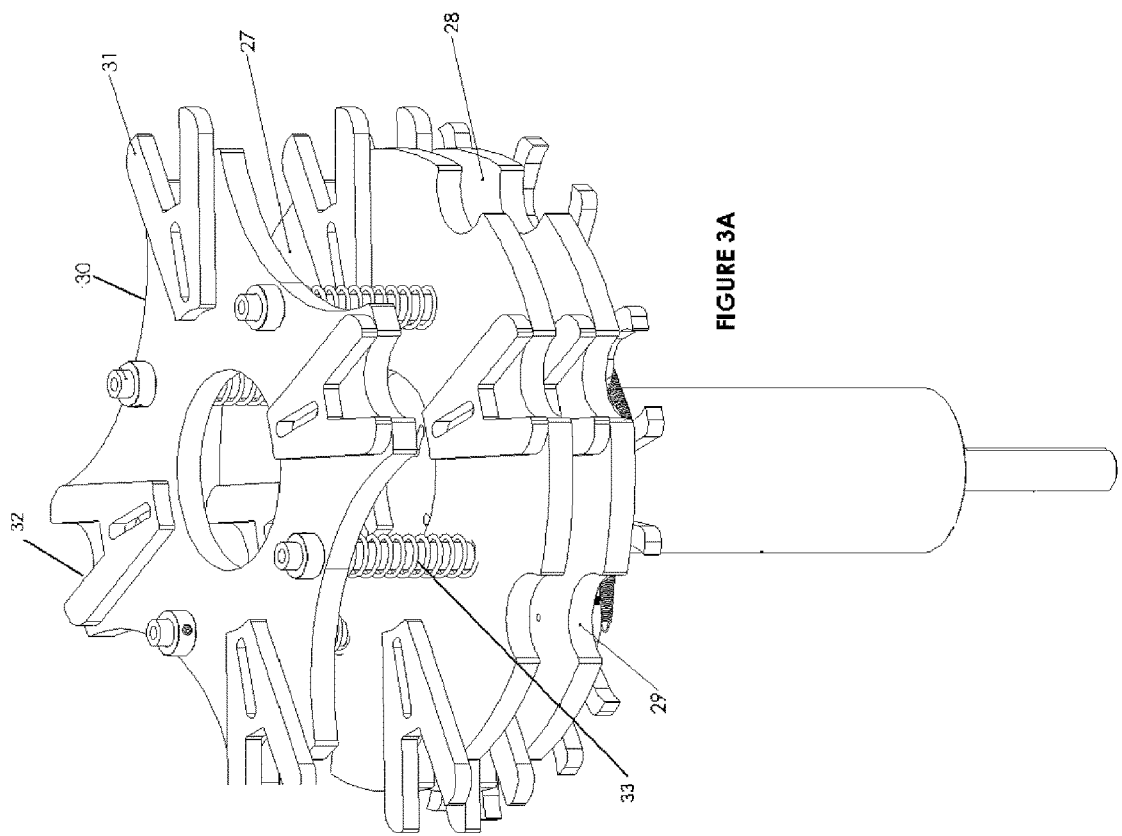
FIG. 3a is a perspective view of one embodiment of a guideless starwheel assembly of the present invention.

With reference to FIGS. 3a and 3b, a guideless rotary transfer starwheel 200 is also provided as part of the present disclosure. In traditional systems, starwheels need to be changed for each type of container to be handled, and only one type of container can be handled by each starwheel. By eliminating the need for container specific opposing guides, the present starwheel eliminates the capital cost of incremental change parts and the cost and time involved in operational changeover.

Figure 5:
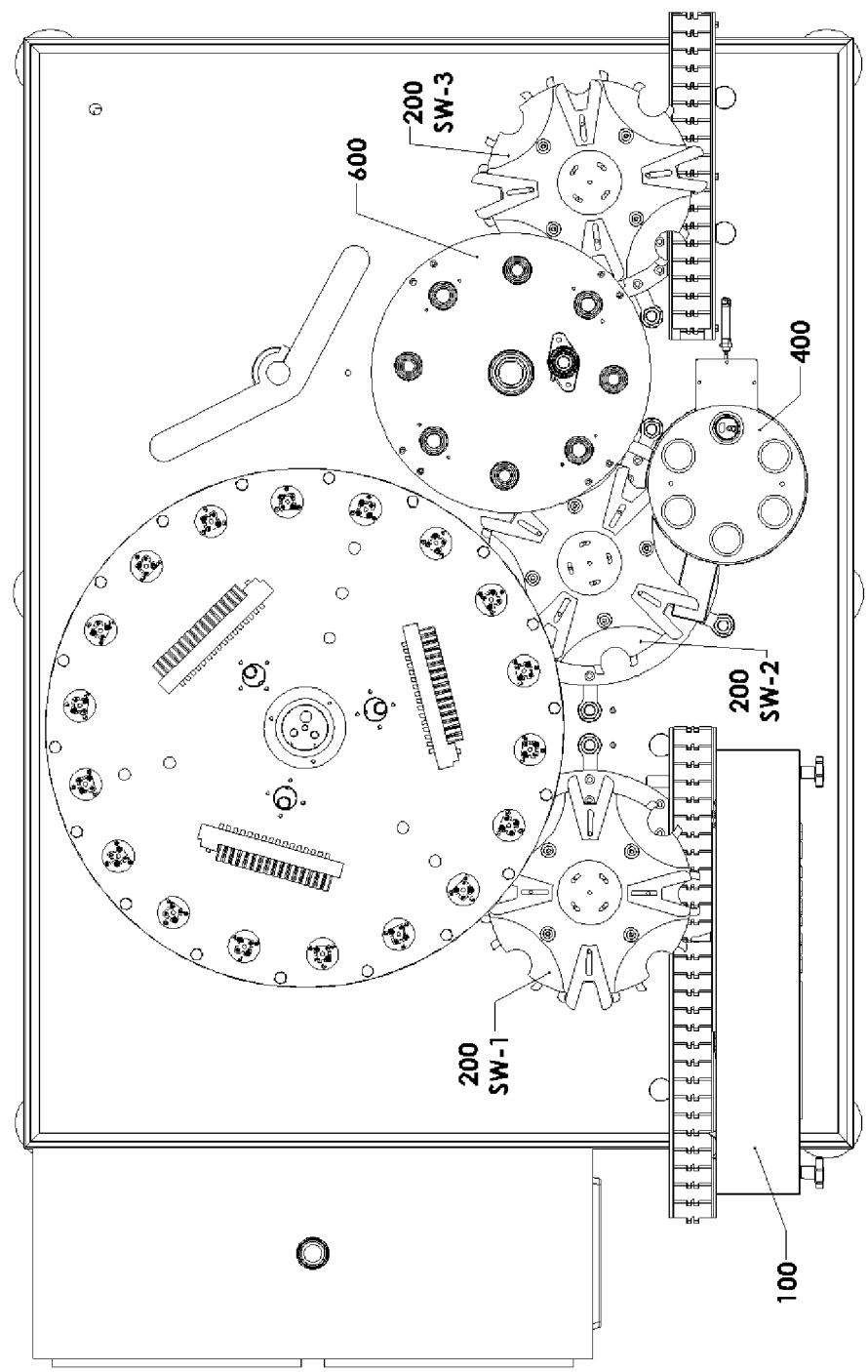
FIG. 5 is a top plan view of one example of a system of the present invention.

Any number of guideless rotary transfer starwheels can be used through the container handling overall process and system, as illustrated in FIG. 5. This includes before filling of the containers, after filling of the containers, before closure of the containers, and at an outfeed of the system overall.

In the embodiment illustrated the present starwheel assembly 200 comprises an upper starwheel 27 and a lower starwheel 28, each formed with multiple container receiving recesses 29, the recesses 29 being generic and sized to accommodate even large containers. It would be understood by a person of skill in the art the variations on this arrangement are also possible without departing from the scope of the present disclosure. In use, a container is received by the starwheel and individually held by pairs of grabber arms 20, more clearly shown in FIG. 3b.

The grabber arms 20 are composed of a leading 20a and trailing 20b grabber that are in one embodiment actuated by a spring 21 to a closed, or grabbing position, and are opened by a fixed mechanical cam comprised of a cam wheel 22 having camming surfaces 23. Alternatively, it is also possible to open the grabber arms 20 by pneumatic or electric actuation means using a control system, without the use of the cam wheel 22. Movement of each trailing 20b and leading grabber arm 20a in a grabber arm pair 20 is mirrored and synchronized to one another by means of mating spur gears 24 formed on an interactive surface of each grabber arm pair that cause relative rotation of each of the leading 20a and trailing 20b grabber arms about their respective pivot points 30. This allows for a single cam lift surface 23 to contact only one of the leading 20a or trailing 20b grabber arms and actuate it to open, while the mating spur gears 24 ensure a similar, but opposite opening movement in the second of the trailing 20b or leading 20a grabber arms. The single set of cam lift surfaces 23 manages operation of the entire starwheel 200 and all grabber arm pairs 20. Contact between the grabber arms 20 and the cam lift surface 23 is delivered through a grabber bearing 26 mounted on the trailing grabber arm of the leading 20a or trailing 20b grabber arms.

The unique grabber arms 20 and sliding V-shaped supports 31 of the present invention accommodate a number of different types of containers such that the variety of containers can be moved by a single starwheel since it is the grabber arms 20 that perform the holding of the container.

With reference to FIG. 3a, the starwheel further comprises a self-adjusting container neck guide plate 30 having a series of sliding V-shaped supports 31 that align with similar V-shaped supports formed on the upper starwheel and lower starwheel. The sliding V-shaped supports 31 comprise a v-shaped slot 32 that is capable of radial adjustment. This assists with aligning the container, for example with a centerline of a filling valve of a filler machine in cases where the starwheel 2 is used in conjunction with a filler machine to accommodate differing container neck and body diameters. By incorporating the sliding v-shaped slots 32 and the adjustable grabber arms 20, any container size is accommodated. The sliding V-shaped supports 31 serve to add adjustability to accommodate differing container diameters. In a further preferred embodiment, the upper neck guide plate 30 is supported on the upper starwheel 27 on retractable springs 33 to provide axial upward lift to the upper neck guide plate 30 to accommodate taller containers and bottles.

In a preferred embodiment referenced in 3b, the grabber arms 20 have removable or adjustable tips 32 to accommodate and grip different container sizes.

With reference to FIGS. 4a to 4g, a rotary multi-feed can lid assembly 400 is provided in one aspect of the present disclosure. The multi-feed can lid assembly 400 allows for simple, bulk lid loading.

Figure 4A:
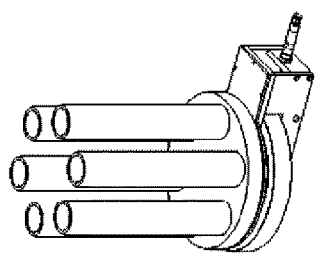
FIG. 4a is a side perspective view of a multi-silo vertical lid feed of the present disclosure.
Figure 4C:
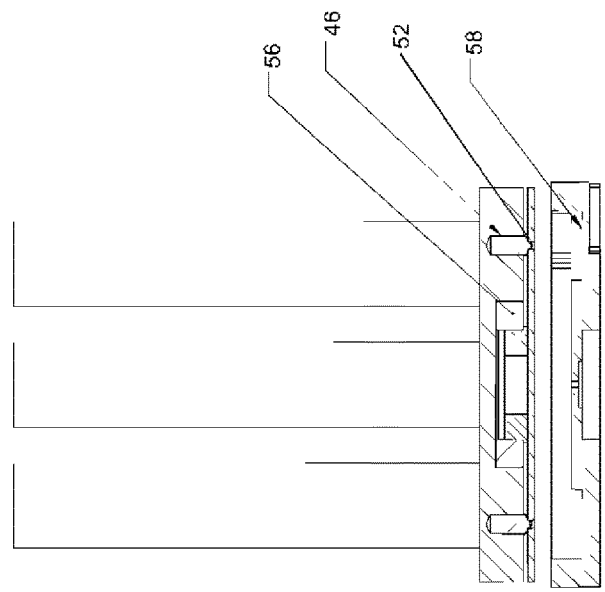
Figure 4B:
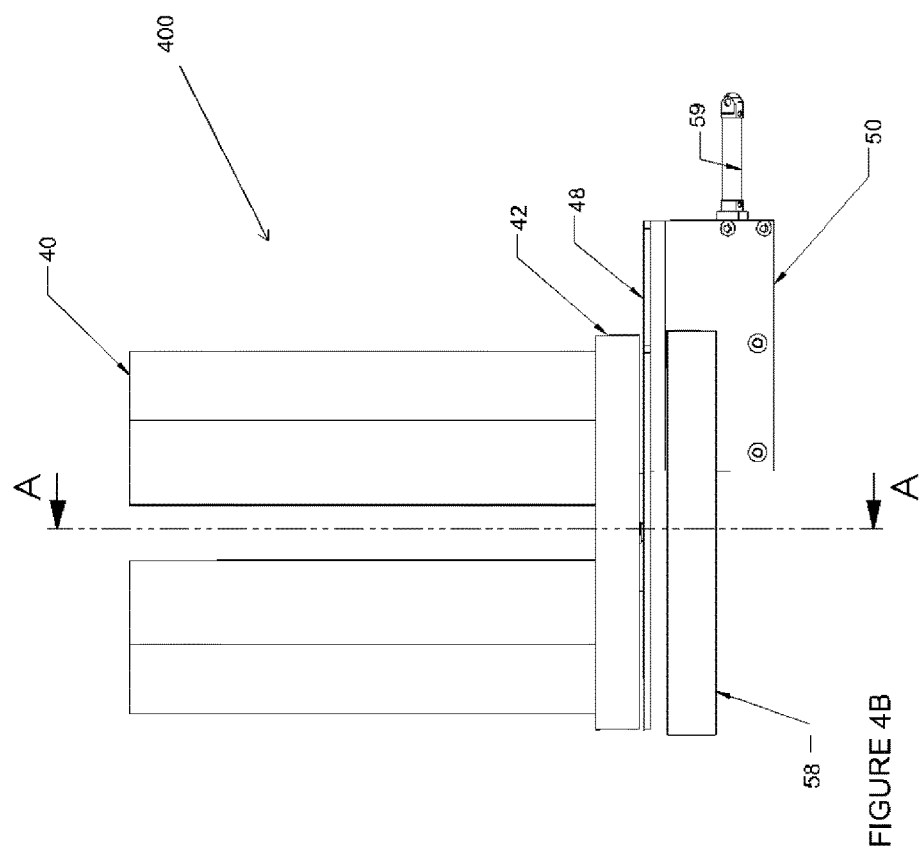
Figure 4E:
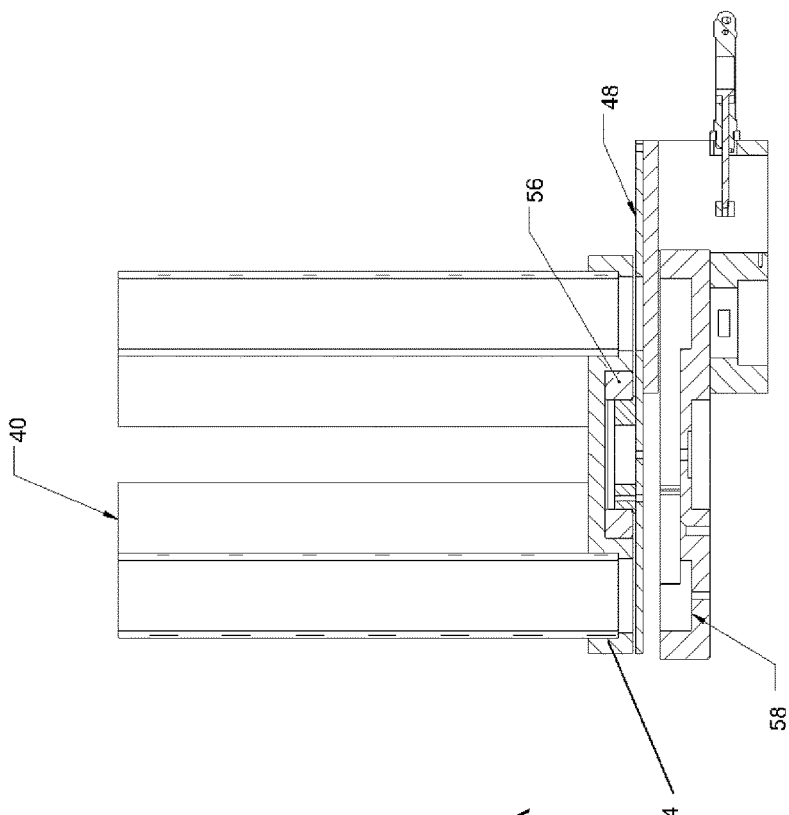
Figure 4D:
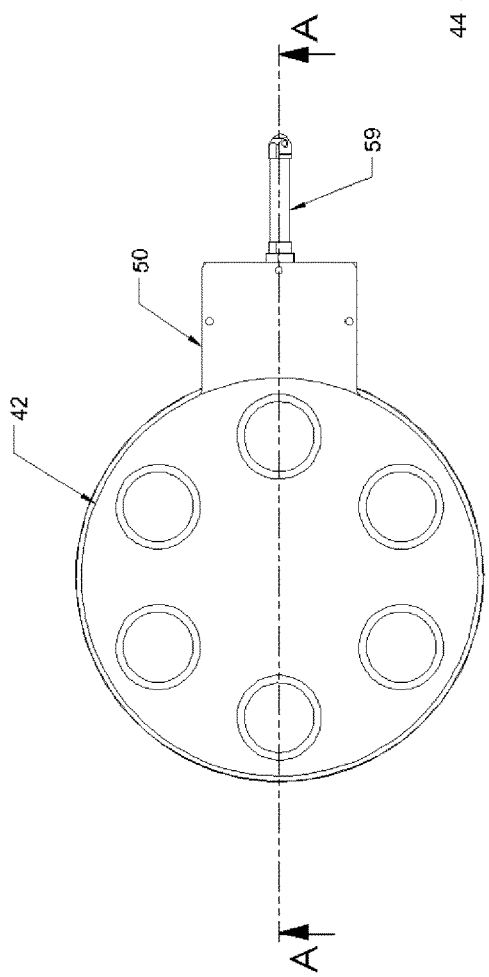
Figure 4G:
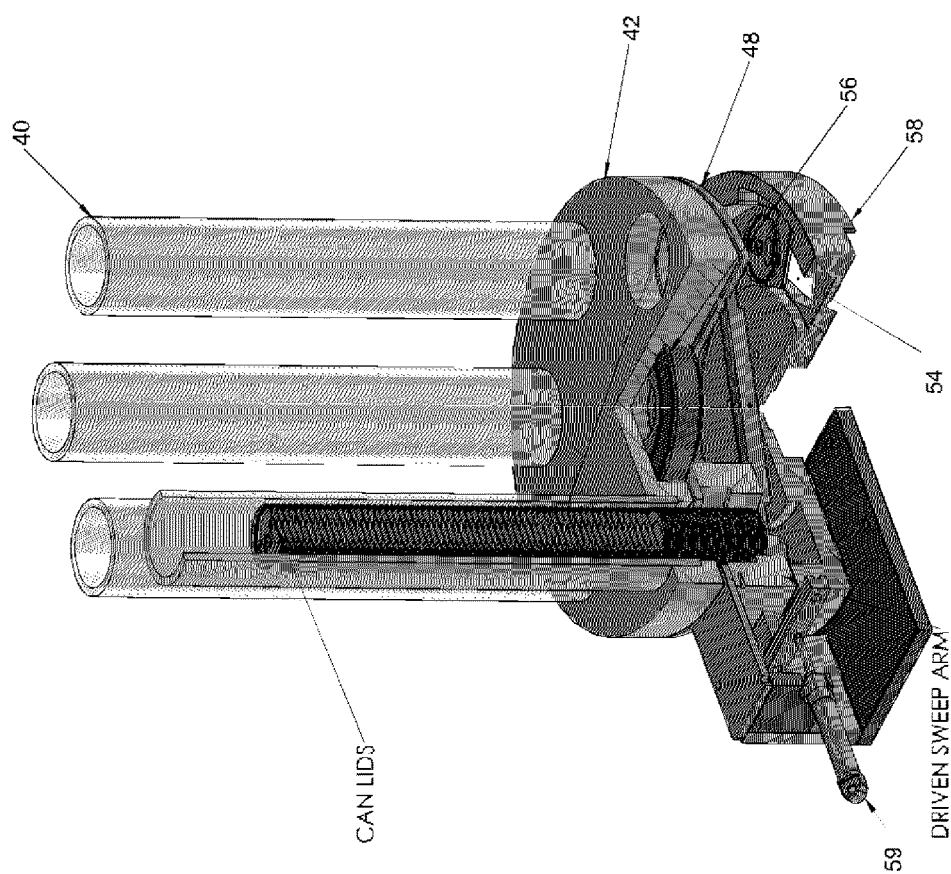
Figure 4F:
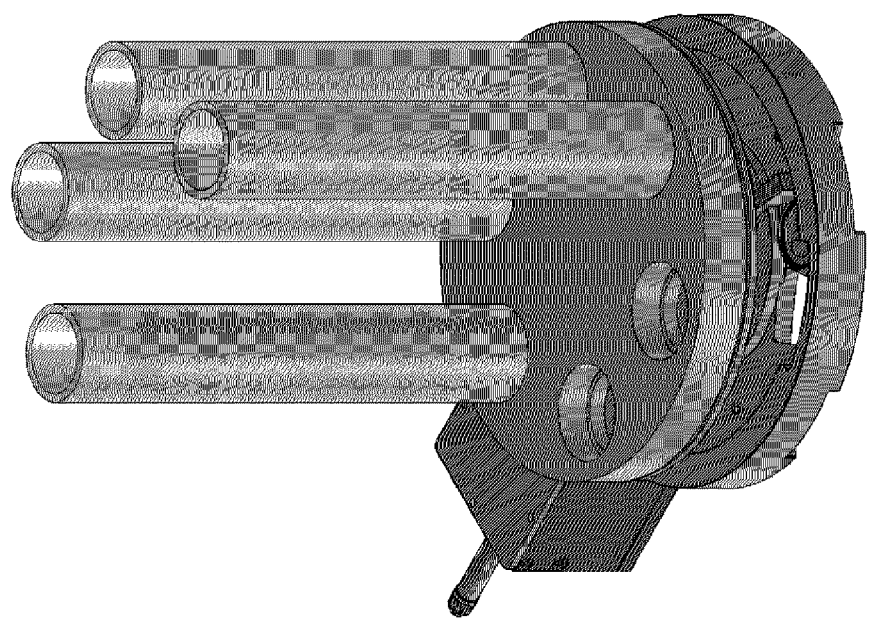

The multi-feed can lid assembly 400 comprises a series of vertical can lid silos 40 containing can lids or like sleeved closures, that rotate on an upper rotating indexing plate 42. The upper rotating indexing plate 42 is machined with a series of indexing holes 44 for accepting the can lid silos 40. Can lids can be indexed through manual, electric or pneumatic means via a spring loaded detent ball catch and release system, as shown in FIGS. 4c and 4e. With electrical or pneumatic actuation operator work would be further reduced by eliminating the need for the operator to rotate the indexing plate as each silo empties.

One or more spring loaded ball detents 46 are affixed to rotate with the upper rotating indexing plate 42 on a pivot bearing 56, and extend between the upper rotating plate 42 and a fixed lower indexing plate 48, the fixed lower indexing plate 48 being positioned between the upper rotating indexing plate 42 and a lid dispenser 50. The fixed lower indexing plate 48 is formed with a series of indents or recesses 52, aligned radially with the ball detents 46, which allow extension of the spring loaded ball detents 46 as they rotate with the upper rotating indexing plate 42. When the ball detent 46 extends into the recesses, then one of the can lid silos 40 are aligned with a single hole machined in the fixed lower indexing plate 48 such that can lids can pass through the lower plate 48 to the lid dispenser 50 and on to a lid feed table 58 which is slotted 54 to transfer the closure to the container. The lid dispenser 50 can be pneumatically operated in some optional embodiments by, for example an air cylinder 59.

The catch and release detent ball system allows the present multi-feed can assembly 400 to require only a simple non-precise rotating motion to achieve accurate alignment and dispensing of lids. This achieves simple, cheap bulk lid loading. Operator reload of lids is simplified and reload frequency is reduced since multiple silos of lids can be filled at one time, thus freeing the operator for other tasks.

Figure 6:
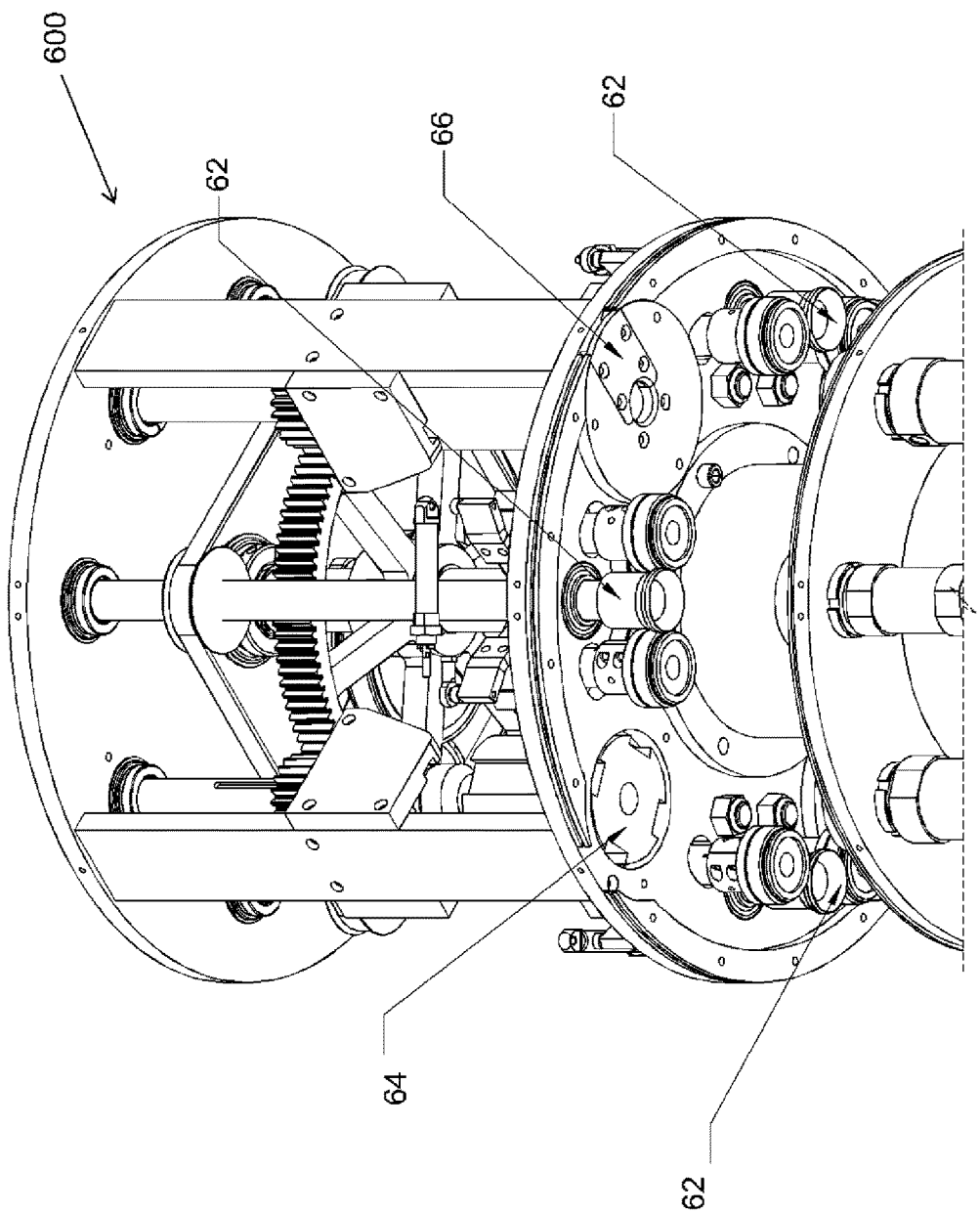
FIG. 6 is a schematic view of a universal closing turret of the present disclosure.

With reference to FIG. 6, a universal closing turret 600 of the present disclosure is shown. The universal closing turret 600 comprises a single rotary or inline turret for closing multiple types of containers. The turret comprises closure applicators for different types of containers.

FIG. 6 depicts one example of a universal closing turret 600 with an exemplary arrangement of closure applicators. In FIG. 6, one or more can closure applicators 62 are interspersed with screw cap style closure applicators 64 such as Stelvin™ and Stelvin Lux™, and roll on pilfer-proof closures applicators for use with such containers as wine bottles and also with one or more crimp crown closure applicators 66. The closure applicators can be arranged in various orders on the closing turret to thereby close a specific order of containers. In one example the closure applicators can be arranged in an alternating order to close a stream of alternating types of containers. In other embodiments, the closure applicators can be arranged in a set of any sequence of closure applicators, to close a set of a particular sequence of containers—and the sequence of closure applicators can be repeated as well. The closure applicators are removably connectable to the turret, allowing rearrangement of closure applicators depending on the series and types of containers to be closed.

Typical closing turrets are dedicated based on the container to be closed. As such closing turrets for bottles differ from those for cans and other containers. As previously discussed, the prior art goal has been to maximize handling and closing volume for a specific type of container and produce as great an output as speedily as possible.

The present inventors have noted that by adapting the closure applicator, closing turrets can be customized to close a variety of containers using a singular machine. In doing so, it enables facilities such as micro-manufacturers to purchase, house and operate a single closing turret for a variety of container closing purposes. This serves to maximize flexibility in filling and closing a wide variety of containers/closures combinations within the same machine footprint. The universal closing turret eliminates the need for multiple closing turrets in order to do a wide range of closures.

FIG. 5 illustrates one example of a system of the present disclosure including a first starwheel SW1 as taught in the present disclosure, positioned as infeed to a filling machine such as that taught in Applicant's issued U.S. Pat. No. 10,407,289, a second starwheel SW2 such as taught in the present disclosure, positioned at the outfeed to the filling machine and feeding into a multi-feed can lid assembly 400 of the present disclosure, and/or universal closing turret 600, followed by a third starwheel SW3 as taught by the present disclosure and indexing assembly 100.

Systems of the present disclosure, such as the example shown in FIG. 5 can thereby process a stream of mixed container types by simply setting a filler machine with the same order of filler heads as the order of container types being processed and setting the container closure applicator types of the universal closing turret 600 in a similar manner. The present indexing assemblies 100 and starwheel assemblies 200 as used in a system of the present invention have advantageously been designed as described earlier to universally accept multiple container types.

In one example of a method of the present invention, a mixed stream of container types can be received and indexed by a first indexing assembly 100, then fed to a filler machine by a first starwheel SW-1 and filled. The filled, mixed stream of containers can then be fed by a second starwheel SW-2 to a universal closing turret. In the case of the container being cans, the cans are first sorted by the second starwheel SW-2 to the can lid assembly 400 of the present disclosure, before being directed to the universal closing turret 600. The filled and closed mixed stream of containers can then be fed by a third starwheel SW-3 to a second indexing assembly 100 for further processing or packaging.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A container indexing assembly, comprising;
   a. an indexing wheel;
   b. a conveyor chain configured for receiving a mixed stream of bottles and cans from the indexing wheel; and
   c. a series of container indexing arms arranged on the conveyor chain for movement with the conveyor chain, said container indexing arms each configured for indexing a bottle or can as it is received from the indexing wheel,
   wherein driven movement of conveyor chain is transferred to drive the indexing wheel by means of one or more belt drive pulleys, such that a fixed spatial relationship is maintained between the indexing wheel supplying the mixed stream of bottles and cans, and the conveyor chain and indexing arms receiving said mixed stream of bottles and cans, and wherein the fixed spatial relationship is maintained at linear and non-linear speeds.

2. The container indexing assembly of claim 1, further comprising a conveyor driveshaft connected to the conveyor chain for driving the conveyor chain.

3. The container indexing assembly of claim 2, wherein movement of the conveyor chain is transferred via one or more belt drive pulleys to drive the indexing wheel, to set the movement and mechanical relationship between the conveyor chain and the indexing wheel.

4. A rotary container starwheel comprising:
   a. an upper starwheel;
   b. a lower starwheel;
   c. one or more self-adjusting v-shaped container supports radially adjustable to accommodate differing container diameters; and
   d. one or more grabber arms, each of said grabber arms comprising:
      i. a leading grabber and a trailing grabber having mating spur gears formed there between configured to coordinate movement of the leading grabber with the trailing grabber;
      ii. a spring configured to actuate the grabber arm to a closed, container grabbing position; and
      iii. a fixed mechanical cam comprised of a cam wheel having one or more cam lift surfaces configured to contact any one of the leading or trailing grabber arms to actuate opening of the grabber arms.

5. The starwheel of claim 4, wherein the grabber arms comprise removable or adjustable tips to accommodate and grip different container sizes.

6. A rotary multi-feed can lid assembly comprising;
   a. a series of vertical can lid silos
   b. an upper rotating indexing plate configured to rotatably support each vertical silo in an indexing hole formed on the upper rotating indexing plate;
   c. one or more spring loaded ball detents affixed to rotate with the upper rotating indexing plate on a pivot bearing; and
   d. a fixed lower indexing plate, positioned between the upper rotating indexing plate and a lid dispenser; said fixed lower indexing plate formed with a series of indents, aligned radially with the ball detents to allow extension of the spring loaded ball detents as the ball detents rotate with the upper rotating indexing plate, such that when the ball detent extends into the recesses, then one of the can lid silos are aligned with a single hole machined in the fixed lower indexing plate such that can lids can pass through the lower plate to the lid dispenser.

7. A system for processing a stream of multiple container types, said system comprising:
   a. an indexing assembly comprising: an indexing wheel; a conveyor chain configured for receiving a stream of multiple container types from the indexing wheel; and a series of container indexing arms arranged for movement with the conveyor chain, said container indexing arms each configured for indexing a container by its centerline, wherein each of said indexing wheel, conveyor chain and series of container indexing arms are arranged having a fixed spatial relationship to one another other at linear and non-linear speeds;
   b. a first starwheel, for receiving the stream of multiple container types from the indexing assembly, said starwheel comprising: an upper starwheel; a lower starwheel; one or more self-adjusting v-shaped container supports radially adjustable to accommodate differing container diameters; and one or more grabber arms, each of said grabber arms comprising: i) a leading grabber and a trailing grabber having mating spur gears formed there between configured to coordinate movement of the leading grabber with the trailing grabber; ii) a spring configured to actuate the grabber arm to a closed, container grabbing position; and iii.) a fixed mechanical cam comprised of a cam wheel having one or more cam lift surfaces configured to contact any one of the leading or trailing grabber arms to actuate opening of the grabber arms;
   c. a filling machine for receiving the stream of multiple container types from the first starwheel and filling the stream of multiple container types;
   d. a second starwheel positioned at an outfeed to the filling machine for receiving the stream of filled, multiple container types;
   e. a multi-feed can lid assembly, for receiving cans of the stream of filled, multiple container types from the second starwheel for applying can lids to the can; the multi-feed can lid assembly comprising: a series of vertical can lid silos; an upper rotating indexing plate configured to rotatably support each vertical silo in an indexing hole formed on the upper rotating indexing plate; one or more spring loaded ball detents affixed to rotate with the upper rotating indexing plate on a pivot bearing; and a fixed lower indexing plate, positioned between the upper rotating indexing plate and a lid dispenser; said fixed lower indexing plate formed with a series of indents, aligned radially with the ball detents to allow extension of the spring loaded ball detents as the ball detents rotate with the upper rotating indexing plate, such that when the ball detent extends into the recesses, then one of the can lid silos are aligned with a single hole machined in the fixed lower indexing plate such that can lids can pass through the lower plate to the lid dispenser;
   f. a universal closing turret, for receiving cans from the multi-feed can lid assembly and for receiving remaining types of containers from the second starwheel, said universal closing turret comprising multiple, varying closure applicators for different types of containers including cans and bottles, removably connectable to the turret to allow rearrangement of an order of closure applicators based on an order of types of containers to be closed, wherein the closure applicators are for closures selected from can lids, crimped crown closures, screw cap style closures and combinations thereof; and g. a third starwheel, positioned at an outfeed to the filling machine for receiving the stream of filled, closed multiple container types.

8. A method for processing a stream of multiple container types, said method comprising the steps of:

a. feeding a stream of multiple container types to an indexing assembly comprising: an indexing wheel; a conveyor chain configured for receiving a stream of multiple container types from the indexing wheel; and a series of container indexing arms arranged for movement with the conveyor chain, said container indexing arms each configured for indexing a container by its centerline, wherein each of said indexing wheel, conveyor chain and series of container indexing arms are arranged having a fixed spatial relationship to one another other at linear and non-linear speeds;

b. feeding the stream from the indexing assembly to a filler machine by a first starwheel comprising: an upper starwheel; a lower starwheel; one or more self-adjusting v-shaped container supports radially adjustable to accommodate differing container diameters; and one or more grabber arms, each of said grabber arms comprising: i) a leading grabber and a trailing grabber having mating spur gears formed there between configured to coordinate movement of the leading grabber with the trailing grabber; ii) a spring configured to actuate the grabber arm to a closed, container grabbing position; and iii.) a fixed mechanical cam comprised of a cam wheel having one or more cam lift surfaces configured to contact any one of the leading or trailing grabber arms to actuate opening of the grabber arms;

c. filling the stream of multiple container types;

d. receiving the filled, stream of multiple container types by a second starwheel, and feeding cans of the filled, stream of multiple container types to a multi-feed can lid assembly comprising: a series of vertical can lid silos; an upper rotating indexing plate configured to rotatably support each vertical silo in an indexing hole formed on the upper rotating indexing plate; one or more spring loaded ball detents affixed to rotate with the upper rotating indexing plate on a pivot bearing; and a fixed lower indexing plate, positioned between the upper rotating indexing plate and a lid dispenser; said fixed lower indexing plate formed with a series of indents, aligned radially with the ball detents to allow extension of the spring loaded ball detents as the ball detents rotate with the upper rotating indexing plate, such that when the ball detent extends into the recesses, then one of the can lid silos are aligned with a single hole machined in the fixed lower indexing plate such that can lids can pass through the lower plate to the lid dispenser;

e. feeding cans from the multi-feed can lid assembly and a remaining stream of multiple container types from the second starwheel to a universal closing turret comprising multiple, varying closure applicators for different types of containers including cans and bottles, removably connectable to the turret to allow rearrangement of an order of closure applicators based on an order of types of containers to be closed, wherein the closure applicators are for closures selected from can lids, crimped crown closures, screw cap style closures and combinations thereof; and f. feeding the filled and closed stream multiple of container types by a third starwheel.

\* \* \* \* \*